(12) United States Patent
Suyama et al.

(10) Patent No.: US 6,883,829 B2
(45) Date of Patent: Apr. 26, 2005

(54) INFLATOR ASSEMBLY

(75) Inventors: Yoji Suyama, Shiga (JP); Hideo Iseki, Shiga (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/248,011

(22) Filed: Dec. 10, 2002

(65) Prior Publication Data

US 2003/0107208 A1 Jun. 12, 2003

(30) Foreign Application Priority Data

Dec. 10, 2001 (JP) ........................................ 2001-375950
Oct. 21, 2002 (JP) ........................................ 2002-305985

(51) Int. Cl.[7] ............................................. B60R 21/26
(52) U.S. Cl. .................................. 280/736; 280/801.1
(58) Field of Search ................................ 280/736, 737, 280/740, 741, 730.2, 801.1, 808; 297/468

(56) References Cited

U.S. PATENT DOCUMENTS

| | | | | |
|---|---|---|---|---|
| 4,414,181 A | * | 11/1983 | Ford, Jr. ..................... | 422/240 |
| 5,642,902 A | * | 7/1997 | France ........................ | 280/737 |
| 6,010,151 A | | 1/2000 | Honda | |
| 6,109,647 A | | 8/2000 | Akaba et al. | |
| 6,152,484 A | * | 11/2000 | Fischer et al. .............. | 280/736 |
| 6,168,193 B1 | * | 1/2001 | Shirk et al. ............... | 280/730.2 |
| 6,168,196 B1 | | 1/2001 | Nariyasu | |
| 6,170,863 B1 | | 1/2001 | Takeuchi et al. | |
| 6,247,725 B1 | * | 6/2001 | Moller ........................ | 280/737 |
| 6,308,984 B1 | * | 10/2001 | Fischer ....................... | 280/741 |
| 6,485,052 B2 | * | 11/2002 | Specht ........................ | 280/736 |
| 6,612,326 B2 | * | 9/2003 | Specht et al. ............. | 137/68.13 |

FOREIGN PATENT DOCUMENTS

| | | |
|---|---|---|
| EP | 0 960 787 A1 | 12/1999 |
| GB | 2 345 034 A | 6/2000 |
| JP | 2001-213256 A | 8/2001 |
| JP | 2001-315617 A | 11/2001 |
| JP | 2001-322522 A | 11/2001 |

* cited by examiner

Primary Examiner—Faye M. Fleming
(74) Attorney, Agent, or Firm—Foley & Lardner LLP

(57) ABSTRACT

An inflator assembly that has a shorter entire length and can be manufactured easily. The inflator assembly includes a pipe, a piston holder, first and second pipe holding plates, a bracket, and an inflator casing. The pipe is inserted through a pipe through hole in the base of the piston holder, through pipe through holes in the pipe holding plates, and through a spacer ring. The base of the piston holder, the spacer ring, and the pipe holding plates are clamped together between first and second flanges of the pipe. The inflator casing is fitted around the outer periphery of a rear end portions of the pipe and has an inward flange that is clamped and fixed between the first and second flanges of the pipe. Second and third flanges are formed by deforming portions of the pipe to have a larger diameter.

17 Claims, 12 Drawing Sheets

FIGURE 10
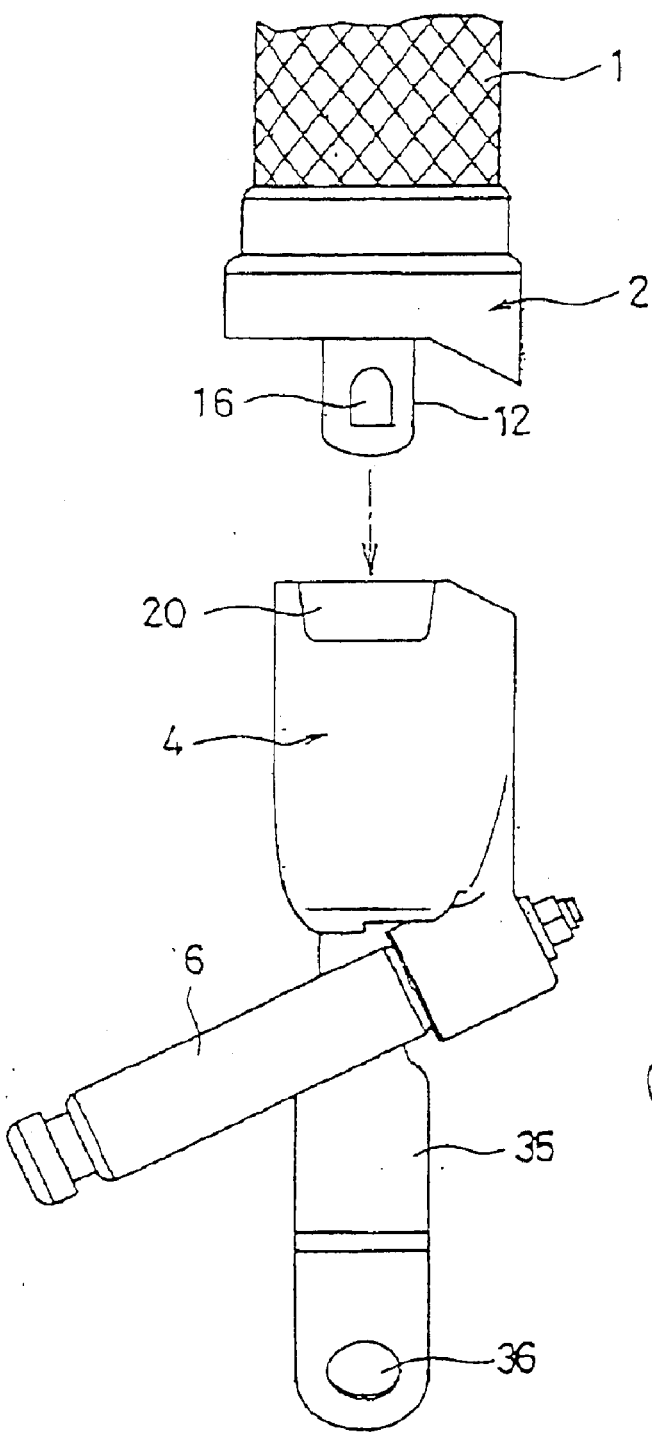
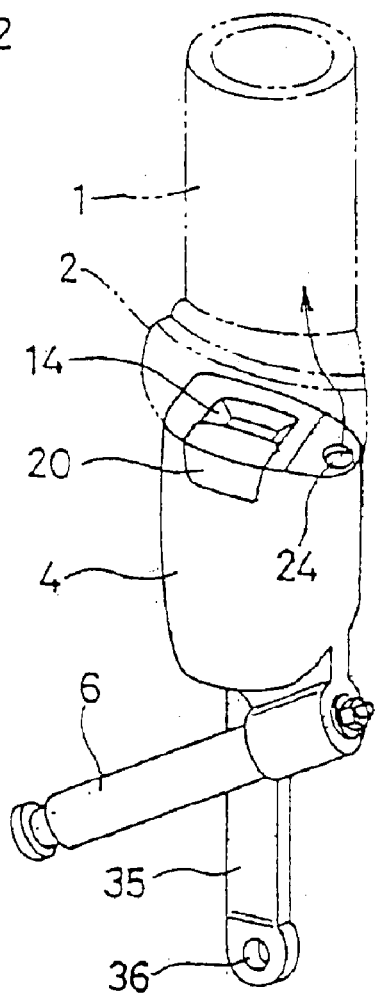

INFLATOR ASSEMBLY

BACKGROUND

The present invention relates to an inflator assembly that can be suitably adapted to a buckle of an inflatable belt device for protecting an occupant of a vehicle, such as an automobile, in the event of a vehicle collision. Such a device is the subject of Japanese Patent Application No. 2001-375950, filed Dec. 10, 2001, and Japanese Patent Application No. 2002-305985, filed Oct. 21, 2002, both of which are hereby incorporated by reference.

A conventional example of a buckle of an inflatable belt device is disclosed in Japanese Unexamined Patent Application Publication No. H 11-334513 (incorporated by reference herein) and is explained below with reference to FIGS. 10(a), 10(b), and 11. FIG. 10(a) is a front view showing a tongue and a buckle of an inflatable belt device according to the conventional example, and FIG. 10(b) is a perspective view of the buckle. FIG. 11 is a structural illustration without an outer shell showing the state where the tongue is latched to the buckle.

The tongue plate 12 is inserted into a tongue insertion slot 14 of the buckle 4. A latch hole 16 of the tongue plate 12 is engaged with a latch pawl of a latching mechanism 18 in the buckle 4, thereby latching the tongue 2 to the buckle 4. The latching is released by pressing a press button 20 provided in the buckle 4 so that the tongue plate 12 is pushed out of the buckle 4 by a spring (not shown).

A numeral 22 designates a tongue sensing switch for sensing when the tongue plate 12 is inserted deeply into the buckle 4 to complete the latching.

A cylindrical piston 24 is disposed beside the tongue insertion slot 14 in the front end surface of the buckle 4 in such a manner as to allow the protrusion of the piston 24 from the buckle 4. The inside of the piston 24 communicates with the inflator 6.

As shown in FIG. 11, a gas passage (duct) 30, which is composed of a pipe, is in communication with gas ports 26, which are formed in a front end portion of the cylindrical inflator 6, via an inflator holder 28. Fixed to the end of the duct 30 is a base portion of a piston holder 32. The piston holder 32 has a substantially cylindrical shape and is arranged coaxially with the duct 30.

The piston 24 has a substantially cylindrical shape and has a front end which is closed with a cover 34. The cover 34 is provided with tear lines (not shown) composed of shallow grooves formed thererin. When a gas pressure from the inflator 6 is applied, the cover 34 is torn along the tear lines to open.

A bracket 35 extends downwardly from the buckle 4. The buckle 4 is mounted to a vehicle body member (not shown) by inserting a bolt through a bolt hole 36 formed in the bracket 35.

When the tongue 2 is latched to the buckle 4, the front end of the piston 24 confronts the gas inlet of the duct 8 of the tongue 2 as shown in FIG. 11. Normally, the piston 24 is held at the rear side of the piston holder 32.

As the vehicle comes into collision from this state, the inflator 6 is actuated, and gas is supplied to the piston 24 through the duct 30. The piston 24 is pushed up by the gas pressure and thus advances to enter through the gas inlet of the duct 8. Then, the cover 34 is torn to open by the gas pressure, and gas flows into the inflatable belt 1 through the duct 8, thus inflating inflatable belt 1.

In this inflatable belt device, the inflator 6, the duct 30, the piston 24, the piston holder 32, and the inflator holder 28 compose an inflator assembly. Hereinafter, the inflator assembly will be described in detail. In the following description the word "front side" means the downstream side of gas flow from the inflator 6, and the word "rear side" means the upstream side of the gas flow.

The inflator 6 has a substantially cylindrical shape and has gas ports 26 formed in the periphery of a front end portion thereof. The inflator holder 28 has a substantially cylindrical shape to be fitted around the outer periphery of the front end portion of the inflator 6 and retains the inflator 6.

The duct (pipe) 30 for introducing gas from the inflator 6 toward the tongue 2 is connected to the inflator holder 28 by screwing a rear end portion of the duct 30 into a duct connecting portion 39, having a substantially cylindrical shape, of the inflator holder 28 or by inserting the rear end portion of the duct 30 into the duct connecting portion 39 and welding the inserted portion to integrate with the duct connecting portion 39. On the other hand, the duct 30 is connected to the piston holder 32 by screwing a front end portion of the duct 30 into a rear end portion of the piston holder 32 or by inserting the front end portion of the duct 30 into the rear end portion of the piston holder 32 and welding the inserted portion to integrate with the piston holder 32.

The inflator holder 28 has a bracket 37. By fixing the bracket 37 to the buckle 4 with a bolt 38, the inflator assembly is secured to the buckle 4.

In the inflator assembly as described above, the entire length of the duct 30 should be long because the duct (pipe) 30 is required to have, at its rear end portion and its front end portion, connection margins to be screwed or inserted into the duct connecting portion 39 and the rear end portion of the piston holder 32. Accordingly, as the inflator 6 is actuated, the front end portion of the duct 30 may rattle due to vibration of the inflator 6 and/or pressure generated when gas spouts from the inflator 6.

The inflator assembly has another disadvantage in that a lot of time and labor are needed for machining the duct (pipe) 30 to form threaded portions to be screwed into the duct connecting portion 39 of the inflator holder 28 and the rear end portion of the piston holder 32 or for welding after the rear end portion and the front end portion of the duct (pipe) 30 are inserted into the duct connecting portion 39 and the rear end portion of the piston holder 32, respectively.

In the aforementioned inflator assembly, since the duct (pipe) 30 is long, the entire length of the inflator assembly extending along the axis of the inflator 6 and the duct 30 is undesirably long. The inflator 6 may project from the rear end of the buckle 4 when the inflator assembly is arranged to extend in the longitudinal direction of the buckle 4. For this, the inflator 6 is arranged to have its longitudinal direction extending across the longitudinal direction of the buckle 4 as shown in FIGS. 10(a), 10 (b), and 11.

When the inflator 6 is arranged to extend across the buckle 4, the inflator 6 protrudes in the width direction of the buckle 4 so as to significantly disturb the pivotal movement of the buckle 4 about the bolt hole 36 formed in a lower end portion of the bracket 35.

Accordingly, one object of the present invention to provide an inflator assembly which can solve these problems and which has a shorter entire length and can be easily manufactured.

SUMMARY OF THE INVENTION

According to an embodiment of the present invention, an inflator assembly is provided. The inflator assembly includes a cylindrical inflator casing, which is filled with a gas generant; a pipe as a gas nozzle connected to the inflator casing; and a bracket holding the pipe. The bracket includes a pipe holding plate, which has an opening through which the pipe is inserted. The pipe has a first flange formed in the periphery of a front side portion of the pipe and is inserted from the rear end portion of the pipe through the opening of the pipe holding plate. The pipe has a second flange, which is formed by deforming a portion of the pipe to have a larger diameter, on the other side of the first flange relative to the pipe holding plate. The pipe holding plate is clamped and fixed between the first flange and the second flange, and the rear end portion of the pipe is fitted in and fixed to a front end portion of the inflator casing.

Since the pipe holding plate is clamped and fixed between the first flange and the second flange formed in the periphery of the pipe so as to unite them, the connection margin between the bracket and the pipe can be significantly reduced, thus enabling the entire length of the pipe to be significantly shortened. Therefore, the entire length of the inflator assembly can be also significantly shortened.

By employing a calking method of compressing the portion of the pipe in the longitudinal direction as the method of deforming the pipe to have a larger diameter, the second flange can be very easily formed in the pipe, thereby significantly facilitating the manufacture of the inflator assembly.

It is preferable that the bracket includes a pair of first and second pipe holding plates which oppose each other. The first and second pipe holding plates have openings through which the pipe is inserted, respectively. Additionally, a spacer ring is disposed between the first and second pipe holding plates such that the spacer ring is coaxial with the openings of the first and second pipe holding plates. The pipe is inserted from a rear end portion of the pipe through the opening of the first pipe holding plate, the spacer ring, and the opening of the second pipe holding plate. After passing the pipe through the second pipe holding plate, the second flange in the pipe is formed by deforming a portion of the pipe to have a larger diameter, such that the first pipe holding plate and the second pipe holding plate are clamped and fixed between the first flange and the second flange.

According to this structure, since the first and second pipe holding plates with the spacer therebetween are clamped and fixed between the first flange and the second flange formed in the periphery of the pipe to unite them, the pipe can be held by the pair of pipe holding plates and the spacer ring with very high stability without increasing the connection margin between the bracket and the pipe.

It is also preferable that the inflator casing has an inward flange in the inner periphery of a front end portion of the inflator casing. The rear end of the pipe is inserted into the front end portion of the inflator casing and is deformed to have a lager diameter so as to form a third flange at the rear end of the pipe. The third flange is fixed to the inward flange of the inflator casing.

According to this structure, since the inward flange of the inflator casing is clamped and fixed between the second flange and the third flange formed in the periphery of the pipe to unite them, the connection margin between the pipe and the inflator casing can be significantly reduced. Therefore, the entire length of the inflator assembly can be further shortened.

Further, by employing a calking method of compressing the portion of the pipe in the longitudinal direction as the method of deforming the pipe to have a larger diameter for forming the flange to be fixed to the inward flange of the inflator casing, the flange can be very easily formed in the pipe.

According to another embodiment of the present invention, the inflator assembly includes a cylindrical inflator casing, which is filled with gas generant; a pipe as a gas nozzle connected to the inflator casing; and a bracket holding the pipe. The bracket has a pipe holding plate, and the pipe holding plate has an opening through which the pipe is inserted. The pipe has a flange formed in the periphery of a front side portion of the pipe, and, after the pipe is inserted from a rear end portion of the pipe through the opening of the pipe holding plate, said rear end of the pipe is fitted in and fixed to a front end portion of the inflator casing.

According to this embodiment of the invention, the second flange is arranged between the pipe holding plate and the front end of the inflator casing in the first embodiment is omitted from the second embodiment. The pipe holding plate is clamped and fixed between the flange formed in the front end portion of the pipe and the front end of the inflator casing in which the rear end of the pipe is fitted. In the inflator assembly described above, the time and labor to be taken for forming the second flange can be omitted so that the manufacturing process of the inflator assembly can be further simplified, which results in improved of the labor effectiveness and cost reduction. In addition, the length of the pipe can be further shortened for the omission of the second flange, as compared to that of the inflator assembly of first embodiment.

The bracket may include, as the pipe holding plate, a pair of first and second pipe holding plates that oppose each other. The first and second pipe holding plates have openings, through which the pipe is inserted, respectively. A spacer ring is disposed between the first and second pipe holding plates such that the spacer ring is coaxial with the openings of said first and second pipe holding plates. After the pipe is inserted from a rear end portion of the pipe through the opening of the first pipe holding plate, the spacer ring, and the opening of the second pipe holding plate, the rear end of the pipe is fitted in and fixed to a front end portion of said inflator casing.

According to this structure, since the first and second pipe holding plates with the spacer therebetween are clamped and fixed between the flange formed in the periphery of the pipe and the front end of the inflator casing to unite them, the pipe can be held by the pair of pipe holding plates and the spacer ring with very high stability without increasing the connection margin between the pipe and the bracket.

Further, by employing a calking method of compressing the portion of the pipe in the longitudinal direction as the method of deforming the pipe to have a larger diameter for forming the flange to be fixed to the inward flange of the inflator casing, the flange can be very easily formed in the pipe.

It is also preferable that the inflator casing has an inward flange in the inner periphery of a front end portion of the inflator casing. The rear end of the pipe is inserted into the front end portion of the inflator casing and is deformed to have a lager diameter so as to form an end flange. The end flange is fixed to the inward flange of the inflator casing.

According to this structure, since the inward flange of the inflator casing is clamped and fixed between the flange and the end flange formed in the periphery of the pipe to unite them, the connection margin between the pipe and the inflator casing can be significantly reduced, thus enabling the significant shortening of the entire length of the inflator assembly.

In another embodiment of the present invention, the inflator assembly includes a cylindrical inflator casing, which is filled with gas generant; a pipe as a gas nozzle, which is formed integrally with the inflator casing to project from the inner periphery of a front end of the inflator casing; and a bracket holding the pipe. The bracket includes a pipe holding plate, which has an opening through which the pipe is inserted. The pipe is inserted from a front end of the pipe through the opening of the pipe holding plate. The pipe has a flange on a side opposite to the inflator casing side relative to the pipe holding plate. The flange is formed by deforming a portion of the pipe to have a larger diameter after being inserted through the pipe holding plate so that the pipe holding plate is clamped and fixed between the front end of the inflator casing and said flange.

In this embodiment, since the inflator casing and the pipe are integrally formed, it is not necessary to hold the inflator casing and the pipe separately during the process of manufacturing the inflator assembly. In addition, since the pipe holding plate is clamped and fixed between the front end of the inflator casing and the flange formed in the front end portion of the pipe, the process for forming a flange is required only one time, thereby making the labor effectiveness of the manufacture of the inflator assembly significantly high. Although the pipe is very short, the inflator casing can be held to insert the pipe through the opening of the pipe holding plate, thereby providing improved workability.

In this embodiment, it is preferable that the bracket has, as the pipe holding plate, a pair of first and second pipe holding plates which oppose each other. The first and second pipe holding plates have openings through which the pipe is inserted, respectively. A spacer ring is disposed between the first and second pipe holding plates such that the spacer ring is coaxial with the openings of the first and second pipe holding plates. The pipe is inserted from the front end of the pipe through the opening of the second pipe holding plate, the spacer ring, and the opening of the first pipe holding plate, and the flange is formed by deforming a portion of the pipe outside of the first pipe holding plate so that said first pipe holding plate and the second pipe holding plate are clamped and fixed between the front end of said inflator casing and said flange.

According to this structure, since the first and second pipe holding plates with the spacer therebetween are clamped and fixed between the front end of the inflator casing and the flange formed in the periphery of the pipe to unite them, the pipe can be held by the pair of pipe holding plates and the spacer ring with very high stability without increasing the connection margin between the pipe and the bracket.

It is to be understood that both the foregoing general description and the following detailed description are exemplary and explanatory only and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 10(a) is a front view of a tongue of an inflatable belt device according to a conventional example.

FIG. 10(b) is a perspective view of an inflatable belt device according to a conventional example.

DETAILED DESCRIPTION

Embodiments of the present invention will be described below with reference to the accompanying drawings.

In the following description, "front side" means the downstream side of gas flow from the inflator, and "rear side" means the upstream side of the gas flow.

Figure 8:
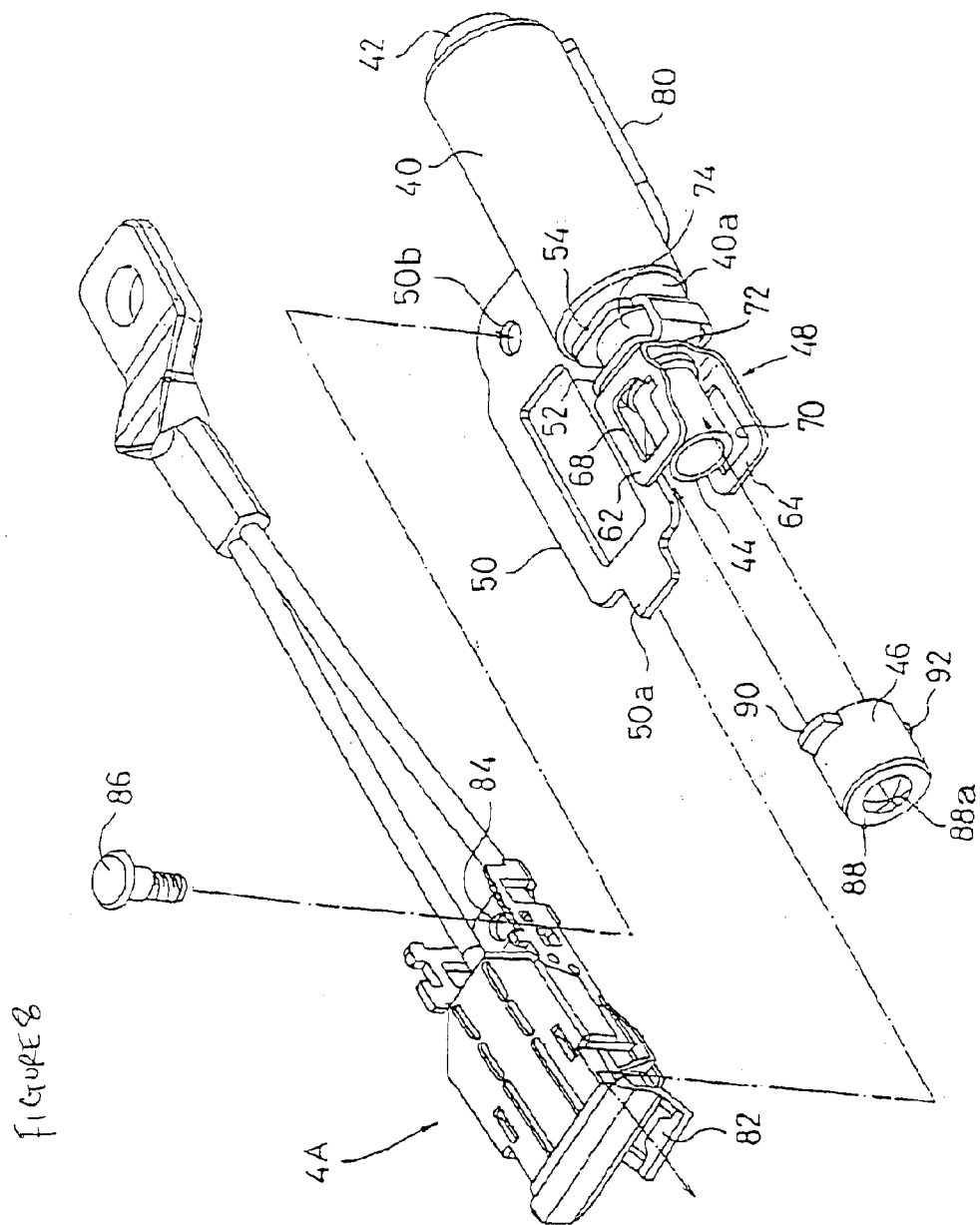
FIG. 8 is an exploded perspective view showing the mounting structure of the inflator assembly to a buckle.
Figure 9:
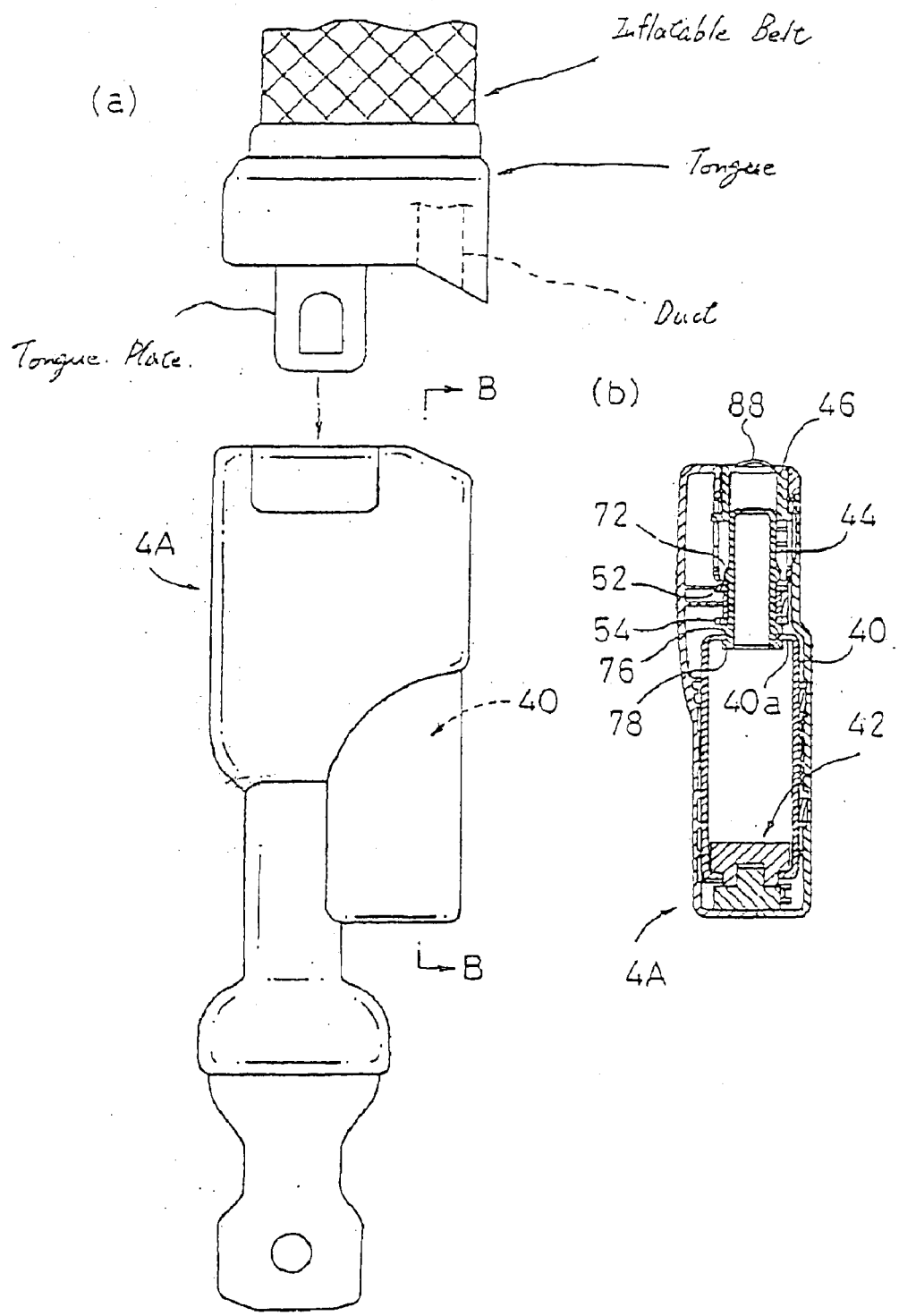
FIG. 9(a) is a front view of the buckle with the inflator assembly.
FIG. 9(b) is a sectional view of the buckle with the inflator assembly.

The inflator assembly comprises a cylindrical inflator casing 40 formed with an inward flange 40a in the inner periphery of a front end portion thereof, an initiator 42 for igniting gas generant accommodated in the inflator casing 40, a pipe (duct) 44 connected to the front end portion of the inflator casing 40, a piston holder 48 for holding a piston 46 (FIG. 8) on the front end portion of the pipe 44, and a plate-like bracket 50 for connecting the above components in a lump to a buckle 4A (FIG. 8, FIG. 9(a)). The inflator casing 40 and the pipe 44 are arranged coaxially with each other along the side of the bracket 50.

The inflator casing 40, the gas generant accommodated in the inflator casing 40, and the initiator 42 for igniting the gas generant cooperate together to compose an inflator.

Figure 1:
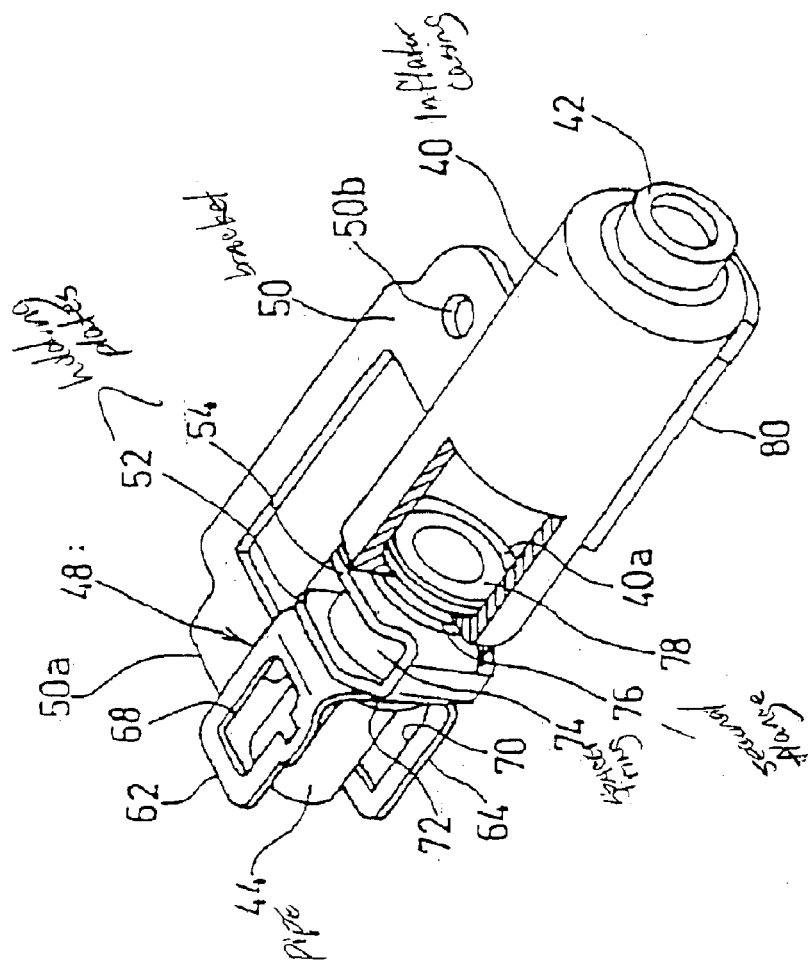
FIG. 1 is a perspective view of an inflator assembly according to an embodiment of the present invention.
Figure 2:
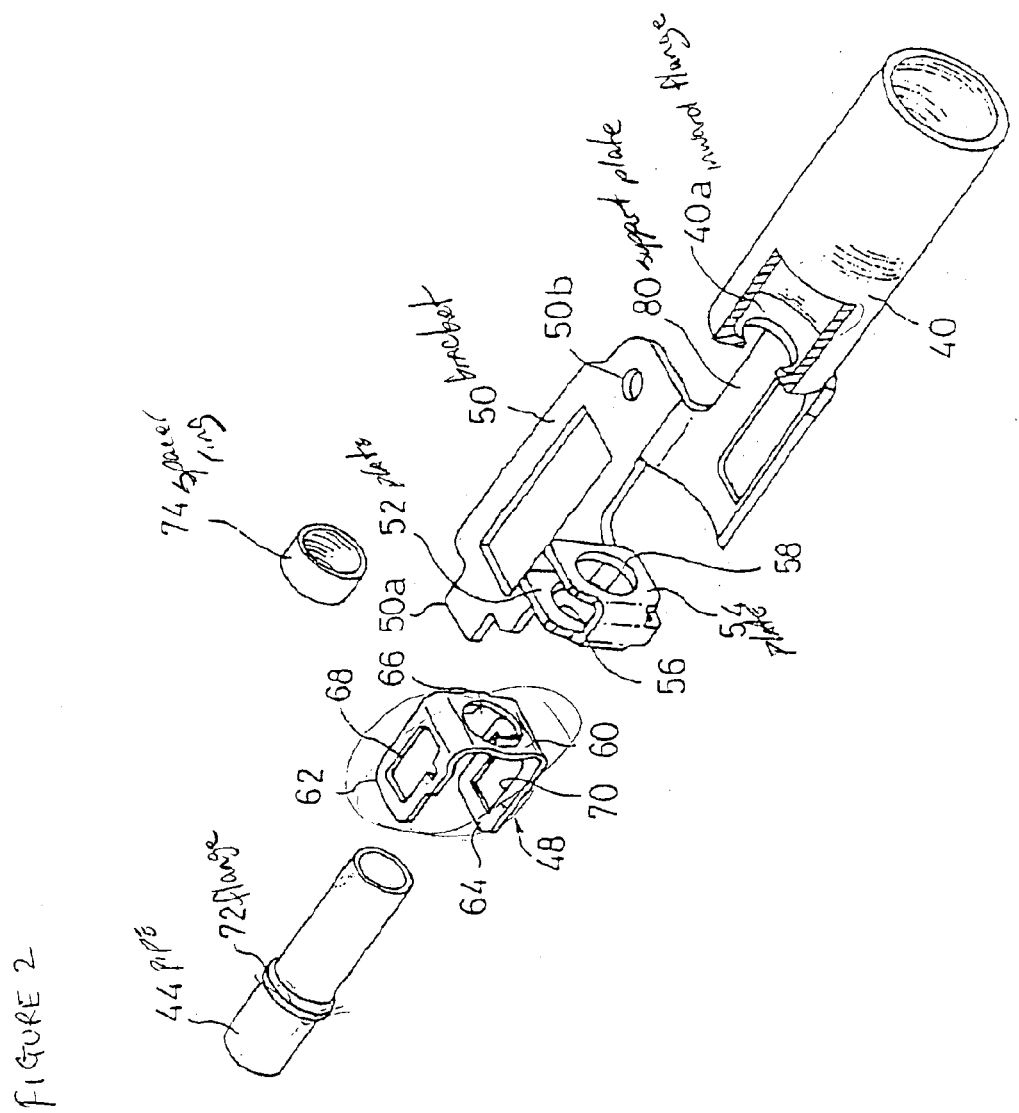
FIG. 2 is an exploded perspective view of the inflator assembly of FIG. 1.
Figure 3:
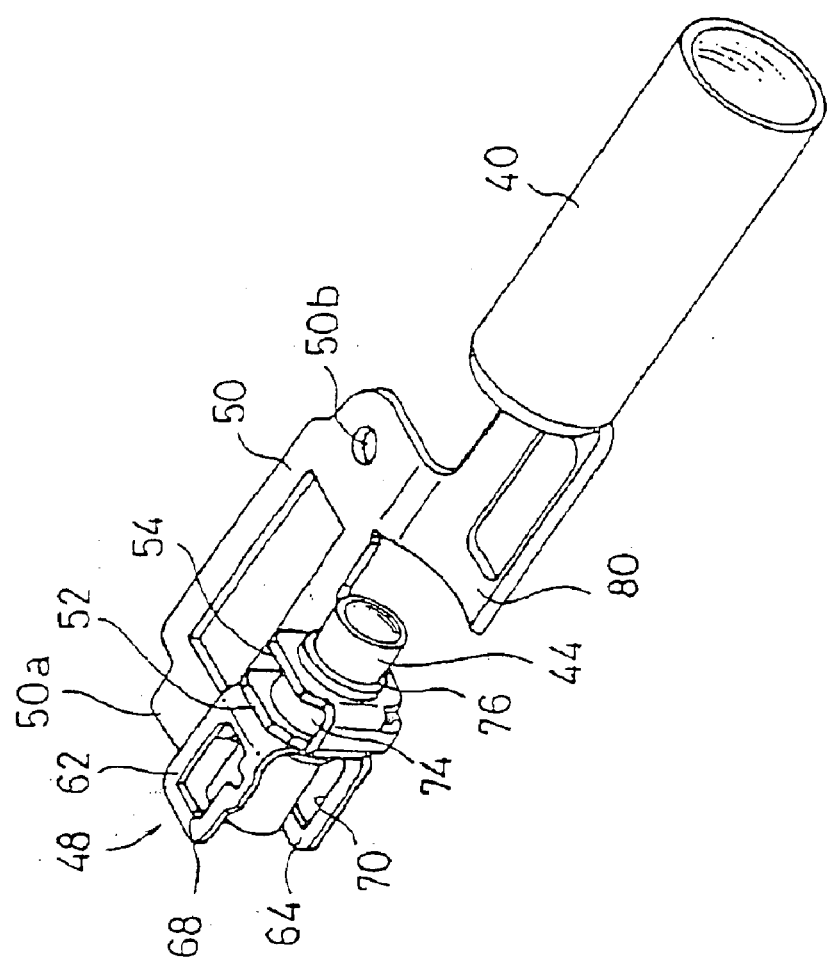
FIG. 3 is an exploded perspective view showing a middle assembling stage of the inflator assembly of FIG. 1.

In this embodiment, as shown in FIG. 2, the bracket 50 has a pair of first and second pipe holding plates 52, 54 projecting from the side of the bracket 50. The first and second pipe holding plates 52, 54 are provided with openings (pipe through holes) 56, 58, respectively. The pipe 44 is inserted through the pipe through holes 56, 58. The pipe holding plates 52, 54 are arranged to extend parallel to each other with a predetermined distance therebetween. The first pipe holding plate 52 is positioned on the front end side of the pipe 44, and the second pipe holding plate 54 is positioned on the rear end side of the pipe 44. The pipe through holes 56, 58 are arranged coaxially with each other such that an axial line extending through the respective centers is parallel to the extending direction of the side of the bracket 50.

The piston holder 48 has a base 60, which is arranged along the outer surface (the opposite side of the surface confronting the second pipe holding plate 54) of the first pipe holding plate 52, and a pair of opposite walls 62, 64, which project from opposite sides of the base 60 toward the front end of the pipe 44 such that the pipe 44 is sandwiched between the opposite walls 62, 64. The base 60 is provided with a pipe through hole 66 coaxial with the pipe through holes 56, 58 of the pipe holding plates 52, 54. The opposite walls 62, 64 are provided with guide slots 68, 70, respectively, for guiding the movement of the piston 46.

The pipe 44 is provided with a first flange 72 formed in the outer periphery of the front side portion. The pipe 44 is inserted through the pipe through holes 66, 56, 58 so that the first flange 72 abuts on the base 60 of the piston holder 48. In this embodiment, further, a spacer ring 74 is disposed between the first and second pipe holding plates 52 and 54 coaxially with the pipe through holes 56, 58 so that the spacer ring 74 is fitted around the outer periphery of the pipe 44 between the first and second pipe holding plates 52 and 54.

A second flange 76 is formed in the outer periphery of a rear side portion of the pipe 44 to abut on the outer surface (the opposite side of the surface confronting the first pipe holding plate) of the second pipe holding plate 54 by deforming the portion of the pipe 44 to have a larger diameter. The base 60 of the piston holder 48, the pipe holding plates 52, 54, and the spacer ring 74 are clamped and fixed between the second flange 76 and the first flange 72 so as to unite them.

The inflator casing 40 is fitted around the outer periphery of the rear end portion of the pipe 44 in such a manner that the inward flange 40a at its front end abuts on the second flange 76. The pipe 44 has a third flange 78 formed at the rear end of the pipe 44 to abut on the inward flange 40a by deforming a portion of the pipe 44 to have a larger diameter so that the inward flange 40a is clamped and fixed between the third flange 78 and the second flange 76.

The bracket 50 has a support plate 80 which is disposed on the rear end side of the bracket 50 to support the inflator casing 40 such that the inflator casing 40 is aligned coaxially with the pipe through holes 66, 56, 58. The position of the inflator casing 40 is defined by the support plate 80 whereby the inflator casing 40 is set to the bracket 50.

The initiator 42 is inserted into the inflator casing 40 through the rear end of the inflator casing 40. The rear end of the inflator casing 40 is closed by crimping a rear end portion of the inflator casing 40 to fix the initiator 42.

Now, the method of manufacturing the inflator assembly will be described with reference to FIG. 4 through FIG. 7.

Figure 4:
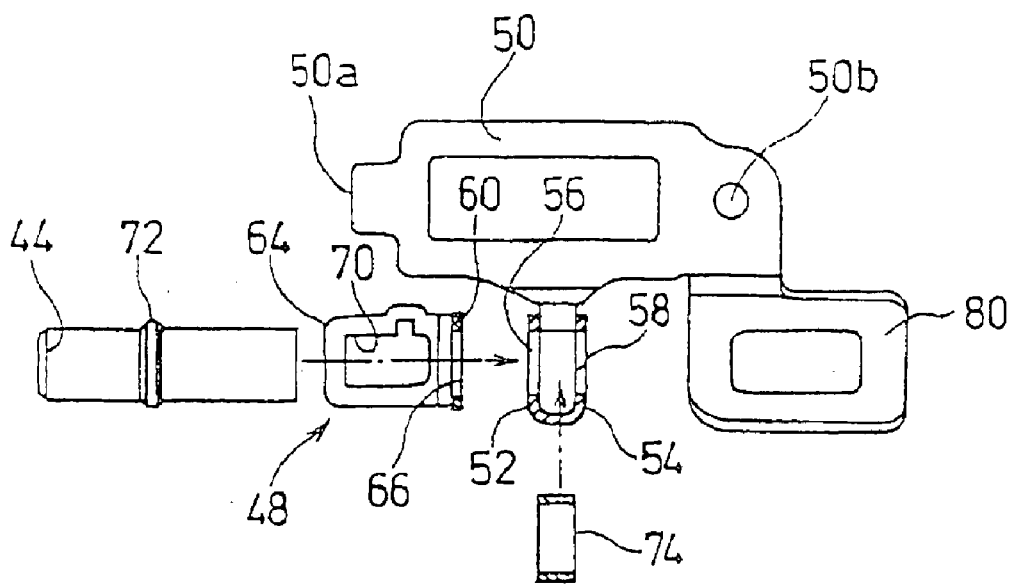
FIG. 4 is a sectional view showing an assembling stage of an inflator assembly according to the present invention.

First, as shown in FIG. 4, the rear side portion of the pipe 44 is inserted through the pipe through holes (openings) 66, 56, and 58, in this order. During this, the spacer ring 74 is previously disposed between the first and second pipe holding plates 52 and 54, whereby the spacer ring 74 is fitted around the outer periphery of the pipe 44 between the pipe holding plates 52 and 54.

Figure 5:
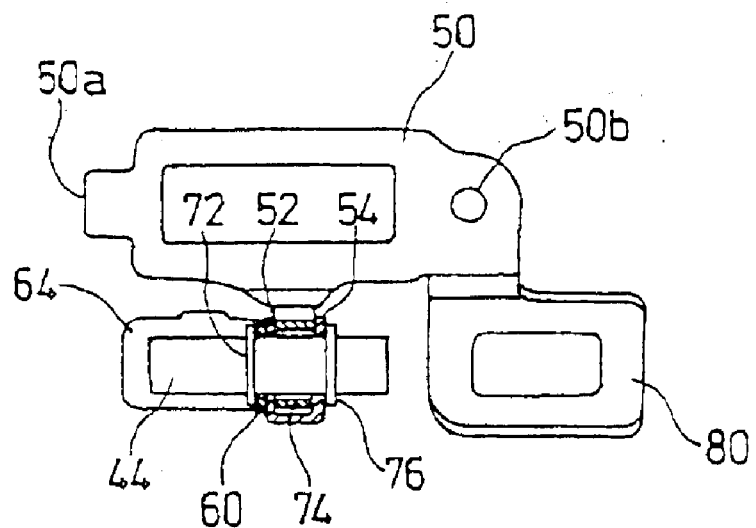
FIG. 5 is a sectional view showing an assembling stage of an inflator assembly according to the present invention.

As shown in FIG. 5, the first flange of the pipe 44 is held in contact with the base 60 of the piston holder 48 with holding the base 60 abutting on the outer surface of the first pipe holding plate 52. In this state, a rear side portion of the pipe 44 is deformed to have a larger diameter to abut on the outer surface of the second pipe holding plate 54, thereby forming the second flange 76.

Figure 6:
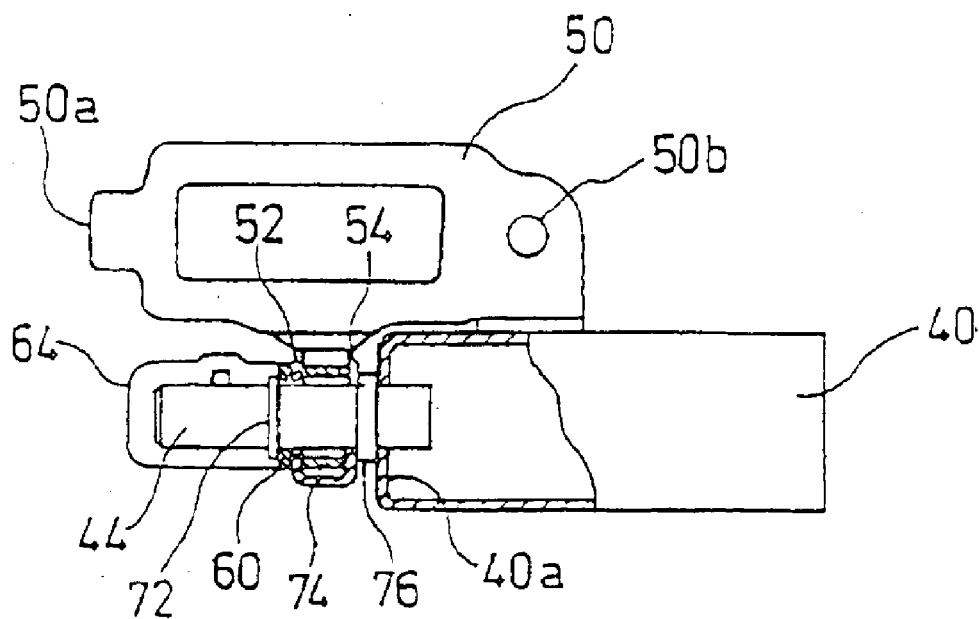
FIG. 6 is a sectional view showing an assembling stage of an inflator assembly according to the present invention.
Figure 7:
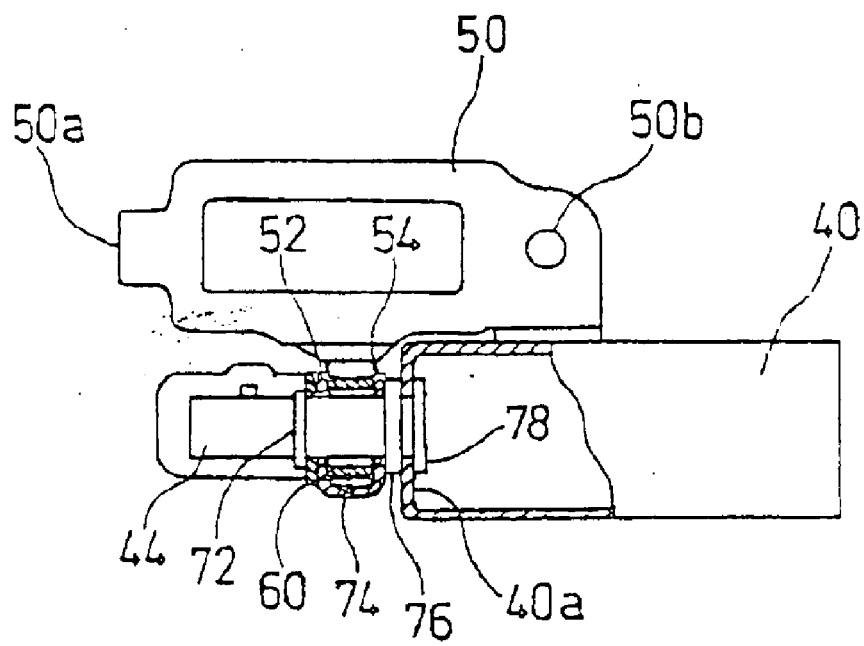
FIG. 7 is a sectional view showing an assembling stage of the inflator assembly according to the present invention.

Then, as shown in FIG. 6, the front end portion of the inflator casing 40 is fitted around the outer periphery of the rear end portion of the pipe 44 in such a manner that the outer surface of the inward flange 40a comes in contact with the second flange 76. During this, the inflator casing 40 is set on the support plate 80 of the bracket 50. After that, a rear end portion of the pipe 44 is deformed to have a larger diameter to abut on the inner surface of the inward flange 40a, thereby forming the third flange (end flange) 78.

After that, the gas generant is housed in the inflator casing 40, and the initiator 42 is inserted into the rear end portion of the inflator casing 40. The rear end of the inflator casing 40 is crimped to close the rear end of the inflator casing 40. In this manner, the manufacturing of the inflator assembly is completed.

Preferably employed as the method of deforming the pipe 44 to have a larger diameter is a calking method of compressing the portion of the pipe 44 in the longitudinal direction (the axial direction of the pipe) to deform the portion in the radial direction. By employing this method, the second and third flanges 76, 78 can be very easily formed in the pipe 44.

The inflator assembly is mounted to the buckle 4A through the bracket 50. As shown in FIG. 8, the bracket 50 has a projection 50a projecting from the front end thereof. The projection 50a is inserted into a projection engaging portion 82 of the buckle 4A. Then, a bolt 86 is inserted through a bolt hole 84 of the buckle 4A and a bolt hole 50b of the bracket 50 and a nut (not shown) is screwed to the bolt 86, thereby fixing the bracket 50 to the buckle 4A.

Before the inflator assembly is mounted to the buckle 4A, the piston 46 is set to the piston holder 48. The piston 46 has a substantially cylindrical shape and is fitted around the outer periphery of the front end portion of the pipe 44. The front end of the piston 46 is closed by a cover 88. The cover 88 has tear lines 88a extending radially from substantially the center thereof. As a predetermined gas pressure is applied to the cover 88, the cover 88 is torn along the tear lines 88a to open the front end of the piston 46.

The piston 46 has a pair of projections 90, 92 projecting from side surfaces of a rear end portion thereof. The projections 90, 92 are fitted in the guide slots 68, 70 formed in the opposite walls 62, 64 of the piston holder 48, respectively. By allowing the projections 90, 92 to move within the guide slots 68, 70, the piston 46 can move relative to the piston holder 48. The piston 46 exhibits the same work and effect as the piston 24 of the aforementioned inflator assembly shown in FIGS. 10(a), 10(b), and 11.

Figure 11:
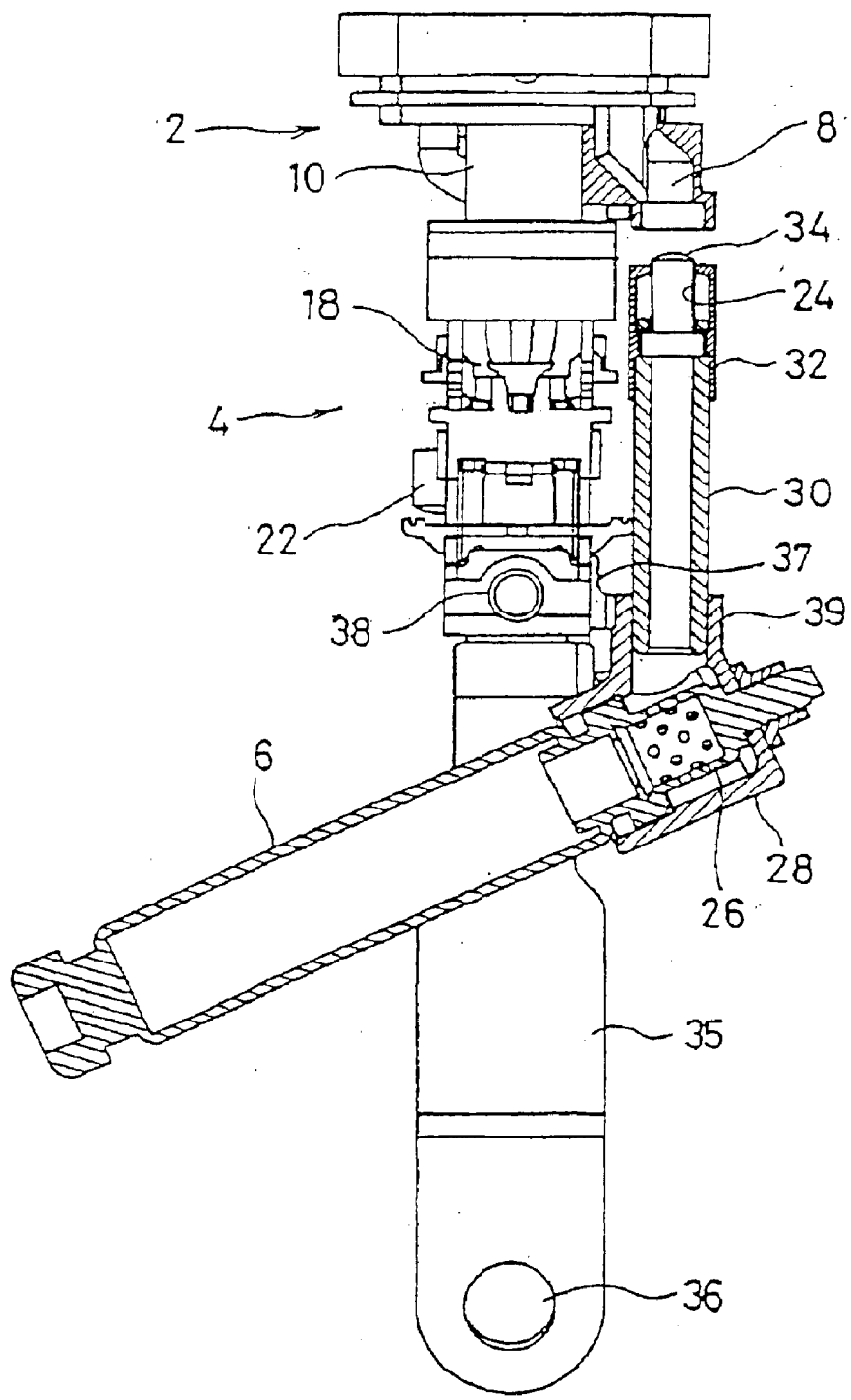
FIG. 11 is a structural illustration showing the latched state of a buckle and a tongue according to a conventional example.

The structure of the buckle 4A is basically the same as that of the buckle 4 shown in FIGS. 10(a), 10(b), and 11 except the mounting structure of the inflator assembly. The structure of the buckle 4A will be understood by the description made with reference to FIGS. 10(a), 10(b), and 11.

According to the inflator assembly of the present invention, the base 60 of the piston holder 48, the pipe holding plates 52, 54, the spacer ring 74, and the inward flange 40a of the inflator casing 40 are clamped and fixed between the first flange 72 and the second flange 76 and between the second flange 76 and the third flange (end flange) 78 of the pipe 44, thereby uniting them. In this manner, the respective connection margins of the pipe 44 can be significantly reduced, thus enabling the significant shortening of the entire length of the pipe 44.

Therefore, the entire length of the inflator assembly, extending along the axial line of the inflator casing 40 and the pipe 44, can be also significantly shortened. Even when the inflator assembly is mounted to extend in the longitudinal direction of the buckle 4A as shown in FIGS. 9(a), 9(b)

the rear end portion of the inflator casing 40 does not project from the rear end portion of the buckle 4A. According to this structure, there is no need to incline the inflator casing 40 relative to the buckle 4A so that no components of the inflator assembly, including the inflator casing 40, protrude in the width direction of the buckle 4A. That is, there is nothing narrowing the pivotable range of the buckle 4A.

In this embodiment, the pipe 44 is held by the two pipe holding plates 52, 54 and the spacer ring 74 between the pipe holding plates 52 and 54, thereby significantly increasing the stability of the pipe 44. However, according to the present invention, the spacer ring may be omitted and a structure with only a single pipe holding plate can be employed. Even if this structure is employed, the duct of the inflator assembly of the present invention can be significantly shortened so that the vibration and amplitude of the duct due to pressure, generated when gas spouts from the inflator, may be quite small. That is, the duct of the inflator assembly of the present invention has improved stability.

Further, in this embodiment, the base 60 of the piston holder 48 and the first and second pipe holding plates 52, 54 are clamped between the first flange 72 and the second flange 76, and the inward flange 40a of the inflator casing 40 is clamped between the second flange 76 and the third flange (end flange) 78. However, just like an inflator assembly shown in FIG. 12, the second flange 76 may be omitted, and the inward flange 40a may be directly laid on the second pipe holding plate 54 so that the base 60, the first and second pipe holding plates 52, 54, and the inward flange 40a are clamped together between the flange 72 and the end flange 78. According to this structure, the manufacturing process of the inflator assembly can be further simplified, resulting in improvement of the labor effectiveness and reduction in the cost. In addition, the length of the pipe 44 can be further shortened for the omission of the second flange 76, thus further improving the stability of the inflator assembly.

Figure 12:
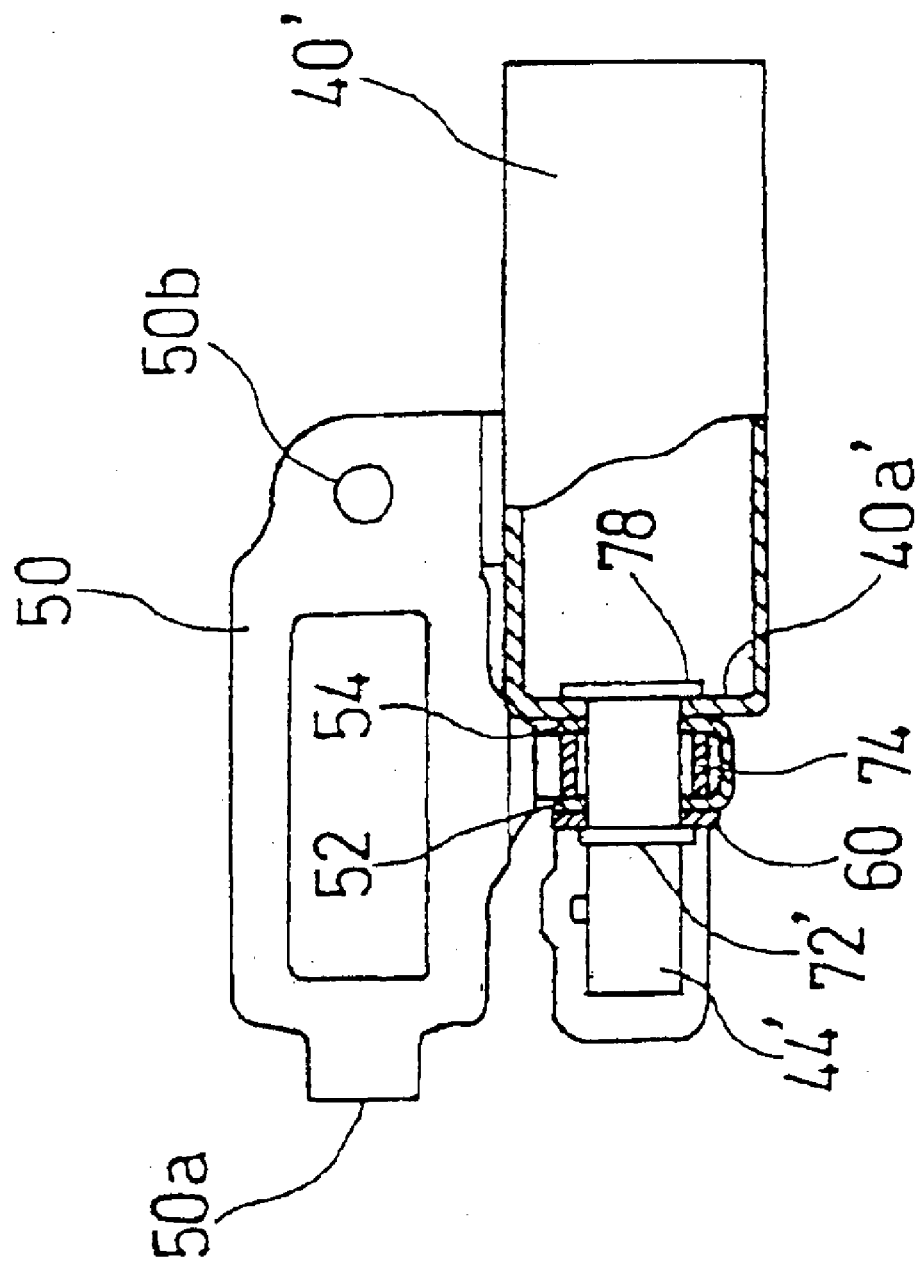
FIG. 12 is a sectional view of an inflator assembly according to another embodiment of the present invention.

The other structure of the inflator assembly shown in FIG. 12 is the same as that of the inflator assembly shown in FIG. 1 through FIG. 9(b). In FIG. 12, the same components as shown in FIG. 1 through FIG. 9(b) are marked with the same numerals, thus omitting the description about the components.

Figure 13:
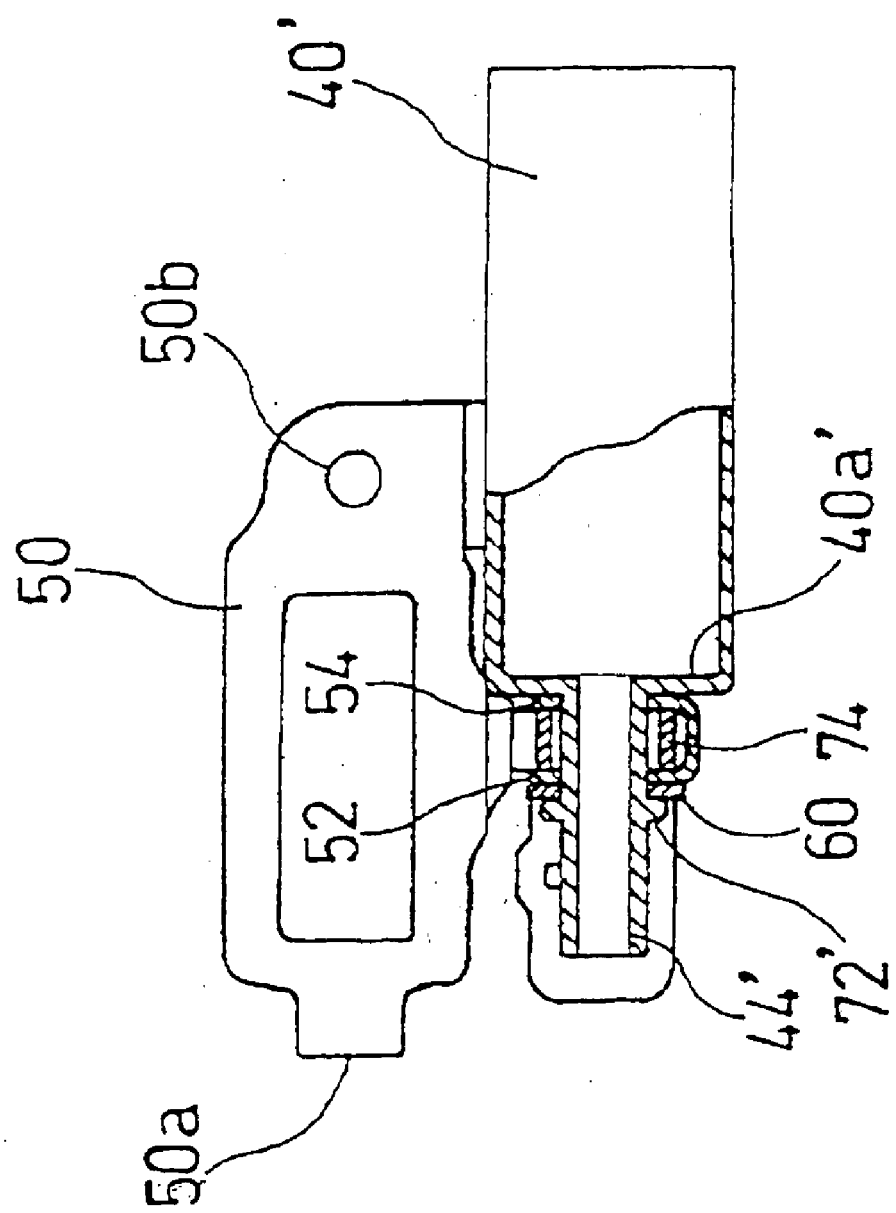
FIG. 13 is a sectional view of an inflator assembly according to still another embodiment of the present invention.
Figure 14:
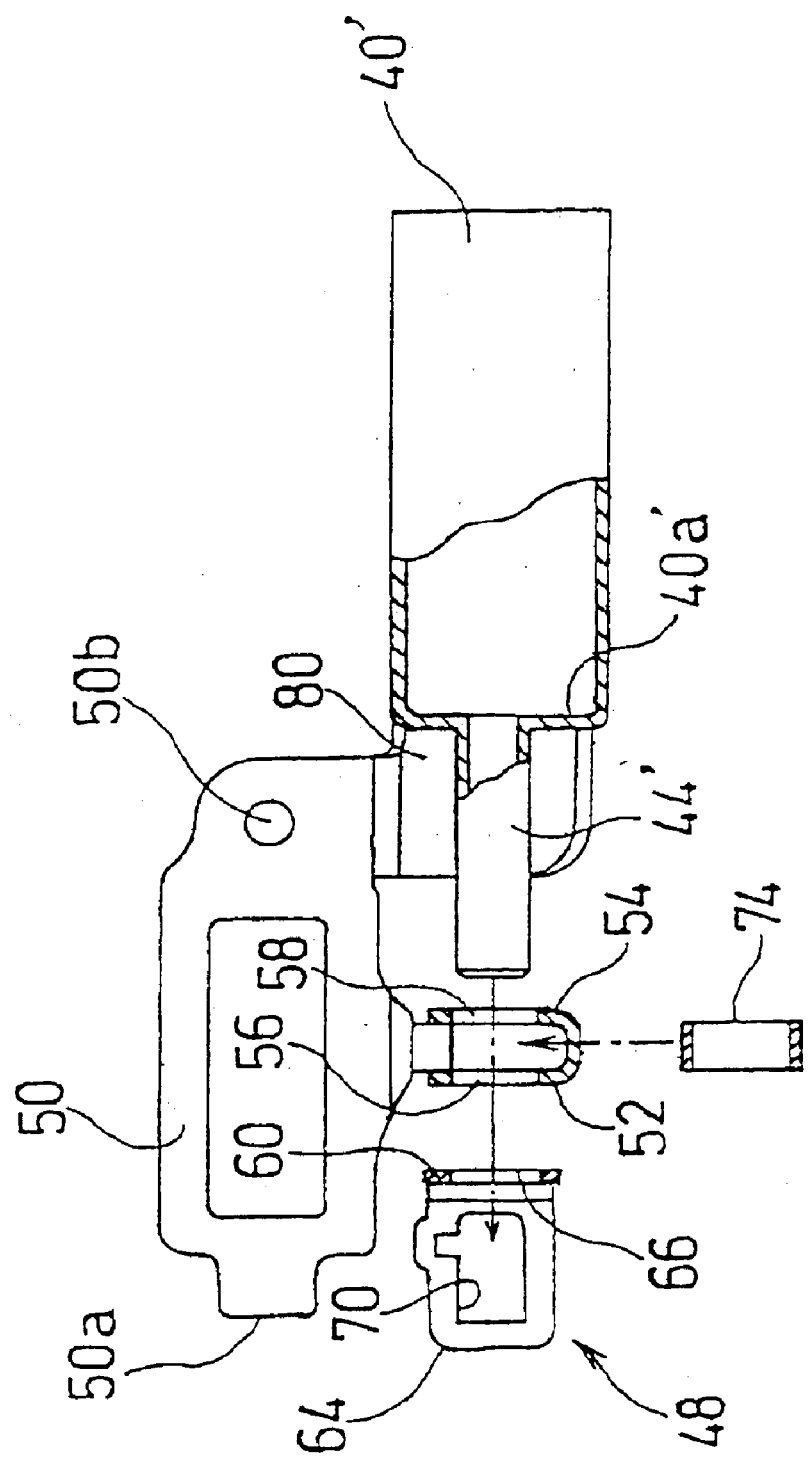
FIG. 14 is an exploded sectional view of the inflator assembly of FIG. 13.

According to the inflator assembly of the present invention, the inflator casing and the pipe (duct) may be formed in an integral component just like an inflator assembly shown in FIG. 13 and FIG. 14.

In the inflator assembly of the present invention shown in FIG. 13 and FIG. 14, a pipe 44' is formed to project from the inner periphery of an inward flange 40a' at the front end of the cylindrical inflator casing 40', which also exhibits as an inflator casing. The pipe 44' is arranged coaxially with the inflator casing 40'.

For manufacturing the inflator assembly, the front side portion of the pipe 44' is inserted through the respective pipe through holes (openings) 58, 56, and 66 of the second pipe holding plate 54, the first pipe holding plate 52, and the base 60 of the piston holder 48, in this order. After that, in the state where the inward flange 40a' is held in contact with the second pipe holding plate 54 and the base 60 is held in contact with the first pipe holding plate 52, a front side portion of the pipe 44' is deformed to have a larger diameter to abut on the base 60, thereby forming a flange 72' as shown in FIG. 13. Therefore, the base 60, and the first and second pipe holding plates 52, 54 are clamped and fixed between the flange 72' and the inward flange 40a' of the inflator casing 40', thereby uniting them.

In the inflator assembly having the aforementioned structure, since the inflator casing 40' and the pipe 44' are integrally formed, there is no need to hold them individually during the process of manufacturing the inflator assembly. Since the base 60 of the piston holder 48 and the first and second pipe holding plates 52, 54 are clamped and fixed between the inward flange 40a' of the inflator casing 40' and the flange 72' formed in the front side portion of the pipe 44', the process for forming a flange is required only one time, thereby making the labor effectiveness of the manufacture of the inflator assembly significantly high. Though the pipe 44' is very short, the inflator casing 40' can be held to insert the pipe 44' through the pipe through holes (openings) 58, 56, and 66, thereby providing improved workability.

The other structure of the inflator assembly shown in FIG. 13 and FIG. 14 is the same as that of the inflator assembly shown in FIG. 1 through FIG. 9(b). In FIGS. 13 and 14 the same components as shown in FIG. 1 through FIG. 9 are marked with the same numerals, thus omitting the description about the components.

As described above, one advantage provided by the present invention is an inflator assembly that has a shorter entire length and can be manufactured easily.

The priority applications, Japanese Patent Application No. 2001-375950, filed Dec. 10, 2001, and Japanese Patent Application No. 2002-305985, filed Oct. 21, 2002 (now published as Japanese Patent No. 2003-471606), are incorporated by reference herein in their entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined a set forth in the following claims.

What is claimed is:

1. An inflator assembly comprising:
    a cylindrical inflator casing configured to be filled with gas generant;
    a pipe configured to be a gas nozzle connected to the inflator casing; and
    a bracket holding the pipe;
    wherein the bracket includes a first pipe holding plate, the first pipe holding plate being provided with an opening through which the pipe is inserted;
    wherein the pipe has a first flange formed in the periphery of a front side portion thereof;
    wherein the pipe has a second flange on the other side of the first flange relative to the pipe holding plate, the pipe holding plate being clamped and fixed between the first flange and the second flange; and
    wherein the rear end portion of the pipe is fitted in and fixed to a front end portion of said inflator casing.

2. An inflator assembly according to claim 1, wherein the bracket includes a second pipe holding plate which is positioned opposite the first pipe holding plate, the second pipe holding plate being provided with an opening through which the pipe is inserted;
    wherein the bracket further includes a spacer ring disposed between the first and second pipe holding plates so that the spacer ring is coaxial with the openings of the first and second pipe holding plates; and
    wherein the first pipe holding plate and the second pipe holding plate are clamped and fixed between the first flange and the second flange.

3. An inflator assembly according to claim 1, wherein the inflator casing includes an inward flange in the inner periphery of a front end portion thereof;
   wherein the pipe includes a third flange at the rear end of the pipe; and
   wherein the third flange is fixed to the inward flange of the inflator casing.

4. An inflator assembly comprising:
   a cylindrical inflator casing configured to be filled with gas generant;
   a pipe configured to be a gas nozzle connected to the inflator casing; and
   a bracket holding the pipe;
   wherein the bracket includes a first pipe holding plate, the first pipe holding plate being provided with an opening through which the pipe is inserted;
   wherein the pipe has a flange formed in the periphery of a front side portion thereof; and
   wherein the rear end of the pipe is fitted in and fixed to a front end portion of the inflator casing.

5. An inflator assembly according to claim 4, wherein the bracket includes a second pipe holding plate which is positioned opposite the first pipe holding plate, the second pipe holding plate being provided with an opening through which the pipe is inserted;
   wherein the bracket further includes a spacer ring disposed between the first and second pipe holding plates so that the spacer ring is coaxial with the openings of the first and second pipe holding plates; and
   wherein the rear end of the pipe is fitted and fixed to a front end portion of the inflator casing.

6. An inflator assembly according to claim 4, wherein the inflator casing includes an inward flange in the inner periphery of a front end portion thereof;
   wherein the pipe has an end flange; and
   wherein the end flange is fixed to the inward flange of the inflator casing.

7. An inflator assembly comprising:
   a cylindrical inflator casing configured to be filled with gas generant;
   a pipe configured to be a gas nozzle which is formed integrally with the inflator casing to project from the inner periphery of a front end of the inflator casing; and
   a bracket holding the pipe;
   wherein the bracket includes a first pipe holding plate, the first pipe holding plate being provided with an opening through which the pipe is inserted;
   wherein the pipe has a flange on a side opposite to the inflator casing side relative to the pipe holding plate; and
   wherein the pipe holding plate is clamped and fixed between the front end of the inflator casing and the flange.

8. An inflator assembly according to claim 7, wherein the bracket includes a second pipe holding plate which is positioned opposite the first pipe holding plate, the second pipe holding plate being provided with an opening through with the pipe is inserted;
   wherein the bracket further includes a spacer ring disposed between the first and second pipe holding plates so that the spacer ring is coaxial with the openings of the first and second pipe holding plates; and
   wherein the first pipe holding plate and the second pipe holding plate are clamped and fixed between the front end of the inflator casing and the flange.

9. An inflatable belt device comprising:
   a tongue;
   a webbing; and
   a buckle comprising an inflator assembly;
   wherein the inflator assembly comprises:
      a cylindrical inflator casing configured to be filled with gas generant;
      a pipe configured to be a gas nozzle connected to the inflator casing; and
      wherein the bracket includes a first pipe holding plate, the first pipe holding plate being provided with an opening through which the pipe is inserted;
      wherein the pipe has a first flange formed in the periphery of a front side portion thereof;
      wherein the pipe has a second flange on the other side of the first flange relative to the pipe holding plate, the pipe holding plate being clamped and fixed between the first flange and the second flange; and
      wherein the rear end portion of the pipe is fitted in and fixed to a front end portion of said inflator casing.

10. The inflatable belt device of claim 9, wherein the buckle includes a slot for receiving the tongue.

11. The inflatable belt device of claim 9, wherein the bracket includes a second pipe holding plate which is positioned opposite the first pipe holding plate, the second pipe holding plate being provided with an opening through which the pipe is inserted;
    wherein the bracket further includes a spacer ring disposed between the first and second pipe holding plates so that the spacer ring is coaxial with the openings of the first and second pipe holding plates; and
    wherein the first pipe holding plate and the second pipe holding plate are clamped and fixed between the first flange and the second flange.

12. The inflatable belt device of claim 9, wherein the inflator casing includes an inward flange in the inner periphery of a front end portion thereof;
    wherein the pipe includes a third flange at the rear end of the pipe; and
    wherein the third flange is fixed to the inward flange of the inflator casing.

13. An inflatable belt device comprising:
    a tongue;
    a webbing; and
    a buckle comprising an inflator assembly;
    wherein the inflator assembly comprises:
       a cylindrical inflator casing configured to be filled with gas generant;
       a pipe configured to be a gas nozzle connected to the inflator casing; and
       a bracket holding the pipe;
       wherein the bracket includes a first pipe holding plate, the first pipe holding plate being provided with an opening through which the pipe is inserted;
       wherein the pipe has a flange formed in the periphery of a front side portion thereof; and
       wherein a rear end of the pipe is fitted in and fixed to a front end portion of the inflator casing.

14. The inflatable belt device of claim 13, wherein the bracket includes a second pipe holding plate which is positioned opposite the first pipe holding plate, the second pipe holding plate being provided with an opening through which the pipe is inserted;
    wherein the bracket further includes a spacer ring disposed between the first and second pipe holding plates so that the spacer ring is coaxial with the openings of the first and second pipe holding plates; and wherein the rear end of the pipe is fitted and fixed to a front end portion of the inflator casing.

15. The inflatable belt device of claim 13, wherein the inflator casing includes an inward flange in the inner periphery of a front end portion thereof;

wherein the pipe has an end flange; and wherein the end flange is fixed to the inward flange of the inflator casing.

16. An inflatable belt device comprising:

a tongue;

a webbing; and a buckle comprising an inflator assembly;

wherein the inflator assembly comprises:

a cylindrical inflator casing configured to be filled with gas generant;

a pipe configured to be a gas nozzle which is formed integrally with the inflator casing to project from the inner periphery of a front end of the inflator casing; and a bracket holding the pipe;

wherein the bracket includes a first pipe holding plate, the first pipe holding plate being provided with an opening through which the pipe is inserted;

wherein the pipe has a flange on a side opposite to the inflator casing side relative to the pipe holding plate; and wherein the pipe holding plate is clamped and fixed between the front end of the inflator casing and the flange.

17. The inflatable belt device of claim 16, wherein the bracket includes a second pipe holding plate which is positioned opposite the first pipe holding plate, the second pipe holding plate being provided with an opening through with the pipe is inserted;

wherein the bracket further includes a spacer ring disposed between the first and second pipe holding plates so that the spacer ring is coaxial with the openings of the first and second pipe holding plates; and wherein the first pipe holding plate and the second pipe holding plate are clamped and fixed between the front end of the inflator casing and the flange.

\* \* \* \* \*